United States Patent [19]

Kargarzadeh et al.

[11] Patent Number: 5,125,815

[45] Date of Patent: Jun. 30, 1992

[54] APPARATUS FOR FORMING A 360 DEGREE SKIN HANDLE

[75] Inventors: Reza Kargarzadeh, Riceville, Tenn.; Ken E. Tuttle, S. Berwick, Me.; John A. Grimes, Dover, N.H.

[73] Assignee: Davidson Textron Inc., Dover, N.H.

[21] Appl. No.: 702,508

[22] Filed: May 20, 1991

Related U.S. Application Data

[62] Division of Ser. No. 377,254, Jul. 10, 1989, Pat. No. 5,037,687.

[51] Int. Cl.$^5$ .................... B29B 11/00; B29D 23/00
[52] U.S. Cl. ........................ 425/112; 249/78; 264/46.6; 425/127
[58] Field of Search ............... 249/78; 264/46.4, 46.6, 264/301, 302, 310, 311; 425/112, 127, 435

[56] References Cited

U.S. PATENT DOCUMENTS

| | | | |
|---|---|---|---|
| 3,170,967 | 2/1965 | Williams et al. | 425/112 |
| 4,766,025 | 8/1988 | Sanok et al. | 425/127 |
| 4,786,447 | 11/1988 | Kouda | 425/112 |
| 4,793,793 | 12/1988 | Swenson et al. | 425/112 |
| 4,824,617 | 4/1989 | Takeuchi et al. | 249/78 |
| 4,900,493 | 2/1990 | Bartels et al. | 264/302 |
| 4,902,458 | 2/1990 | Trimble | 264/46.6 |
| 4,908,170 | 3/1990 | Kurimoto | 264/46.6 |
| 4,948,541 | 8/1990 | Beck | 264/46.6 |
| 5,004,572 | 4/1991 | Kurimoto | 264/46.6 |

Primary Examiner—Jay H. Woo
Assistant Examiner—C. Scott Bushey
Attorney, Agent, or Firm—Reising, Ethington, Barnard, Perry & Milton

[57] ABSTRACT

An apparatus for practicing a method for forming a 360 degree integral skin handle in a thermoplastic part for use in automotive trim products. The apparatus includes a mold with a recess therein and a plug being supported on the mold for movement into a position for closing the tube surface and into a demolding position for releasing the molded part. A heater device directs heat from a first source through the mold and from a second source through the plug to form a completely closed, curved, heated tube surface on which thermoplastic material is cast against the curved, heated tube surface to fuse and cure a layer of material thereon in the form of a tube skin segment which is releasable from the mold when the plug is removed.

2 Claims, 3 Drawing Sheets

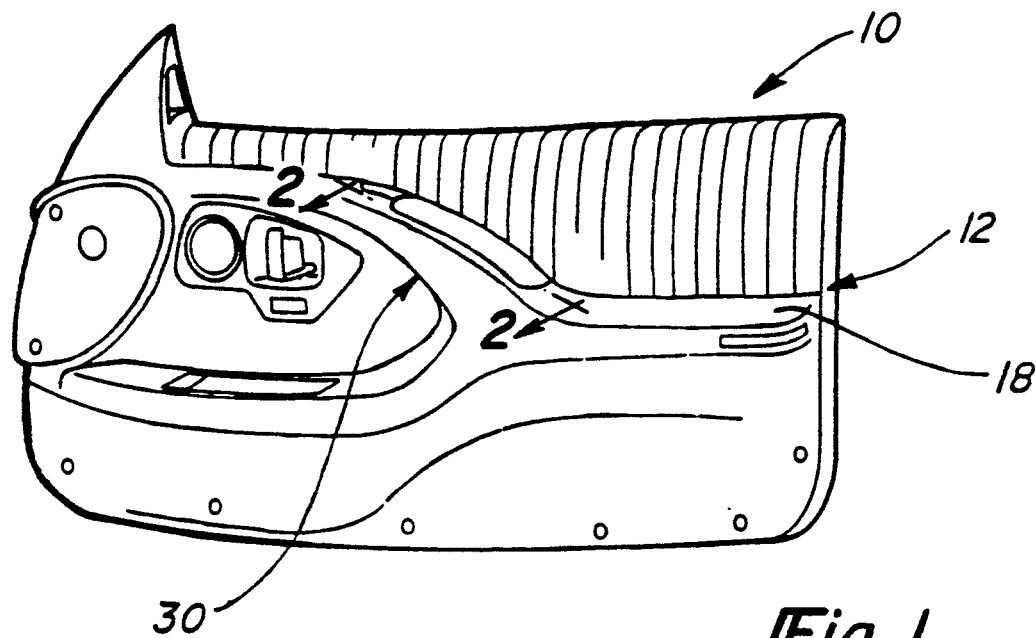
Fig-1
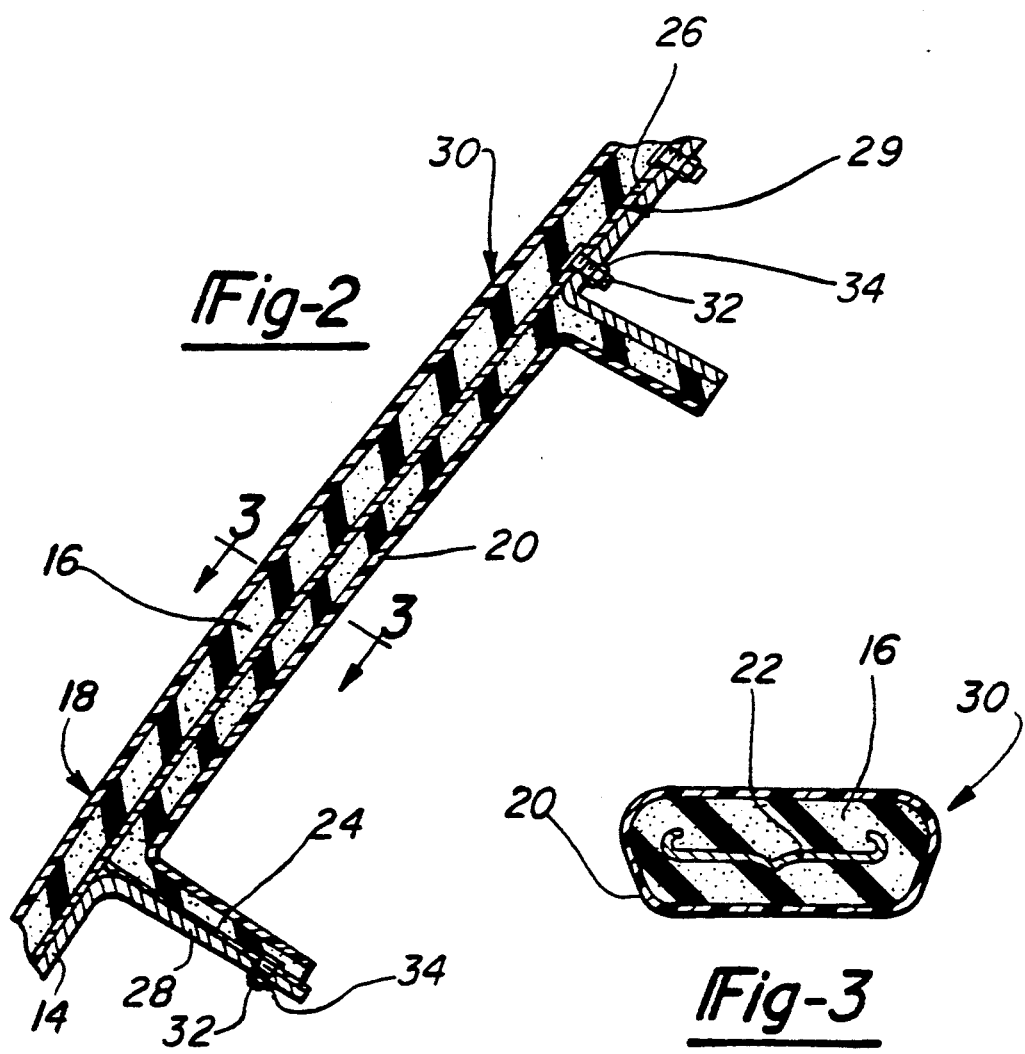
Fig-2
Fig-3

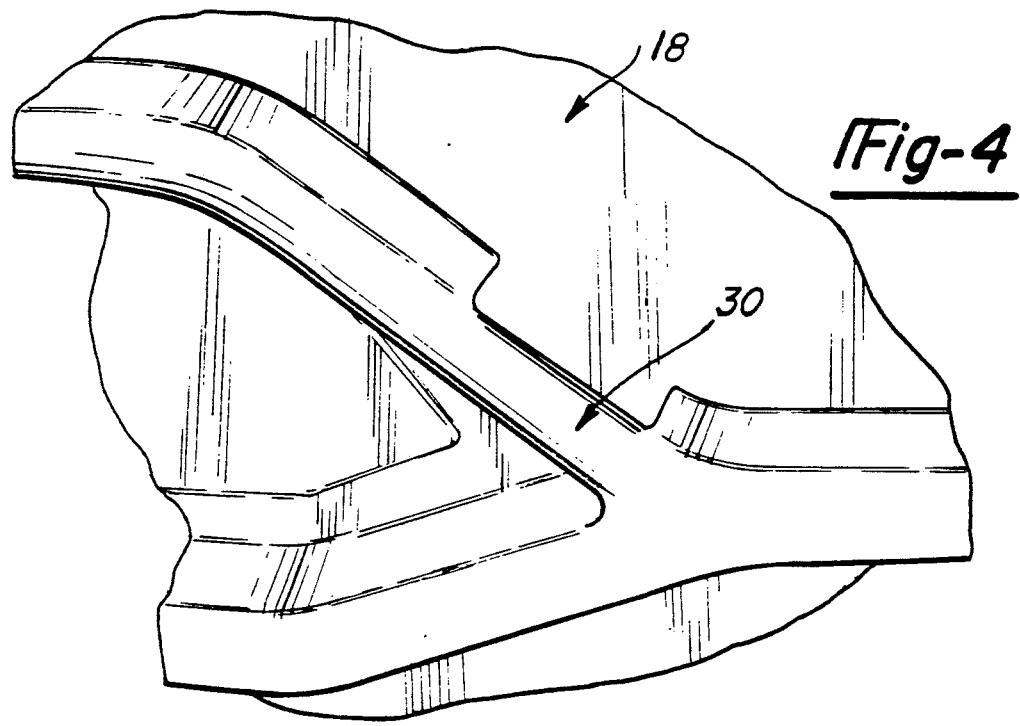
_Fig-4_
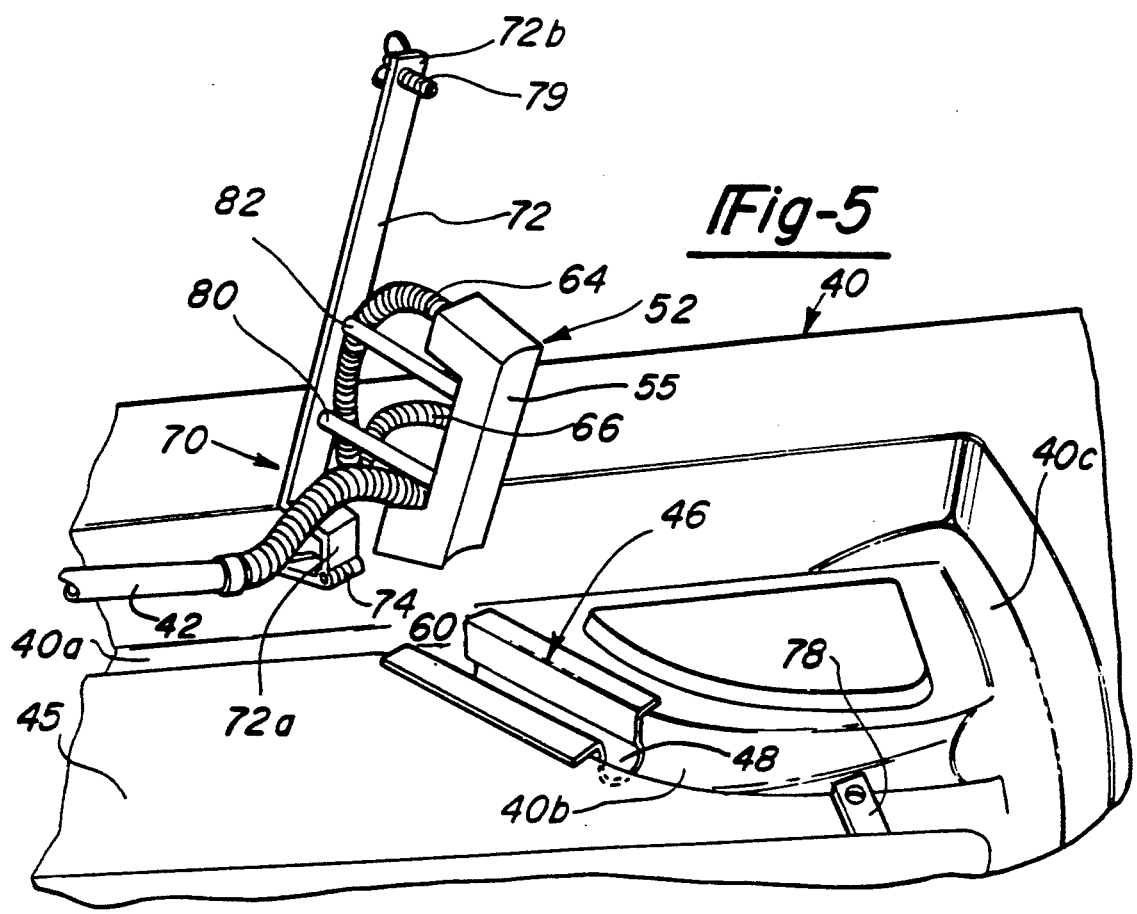
_Fig-5_

APPARATUS FOR FORMING A 360 DEGREE SKIN HANDLE

This is a division of application Ser. No. 377,254 filed on Jul. 10, 1989, now U.S. Pat. No. 5,037,687.

FIELD OF THE INVENTION

This invention relates to methods and apparatus for forming products from thermoplastic material by the steps of casting the material against a heated mold surface and fusing the material thereon to form a skin or shell from the material. More particularly the invention relates to such methods and apparatus wherein the skin or shell is shaped to form handle segments as part of the skin or shell.

BACKGROUND ART

U.S. Pat. No. 4,459,331 discloses a product in which an outer skin is formed with an integral loop portion that forms part of a handle on the product. While suitable for its intended purpose it does not have a full 360 degree skin cover at the handle portion. Rather, the handle is made up of a partial loop portion and a rigid injection molded piece which combine to form the hand grip surface of the handle.

Other padded handle assembles are shown in U.S. Pat. No. 3,123,403 to Hood which discloses an armrest with a soft cellular foam core. U.S. Pat. No. 4,021,072 to Belanger teaches an inner door pull with a soft molding which encases a metal strip. In each case the door handle is formed as a separate element which must be fastened to a door panel or other like interior trim product.

It is also generally known to form skins or shells from powdered, liquid or paste types of thermoplastic material by directing the thermoplastic material directly unto the heated mold for fusing and curing a thin layer of material on the mold to form the shell or skin product. Examples, of such prior art casting methods is set forth in U.S. Pat. Nos. 4,562,025; 4,610,620; and 4,623,503.

It is also generally known to make up composite panels having a rigid structural insert by locating a thin skin or shell of thermoplastic material into a mold cavity part; locating the rigid structural insert in spaced relationship with the skin or shell and then filling a space between the shell and insert with foam precursors that react to form a soft cellular foam core between the shell and the insert. An example of such a method is set forth in U.S. Pat. No. 4,572,856.

STATEMENT OF INVENTION AND ADVANTAGES

In accordance with the invention a method is provided in which a one piece molded product is used to form a full circumference soft outer surface around a hand grip portion of the product.

In accordance with another aspect of the present invention a method is provided to cast a 360 degree tube in a plastic shell for use in the manufacture of a product having an integral handle with a full circumference soft handgrip.

Another aspect of the present invention is to provide an improved one piece integral handle assembly wherein the outer surface of the handle is formed from a tubular skin segment formed integrally of a cover skin for a foamed in place composite panel product.

Still another object of the present invention is to eliminate the use of a hard plastic backplate in the handgrip of a door handle for a vehicle door by a method which forms a shell of fused and cured thermoplastic material by casting the thermoplastic material against a heated mold to form a thin build up of material on the heated mold to form shells of different surface configuration the method characterized by: forming a 360 degree surface on the heated mold through a segment of the casting surface thereof and heating all of the 360 degree surface while the thermoplastic material is cast thereon so as to form a shell having a first generally planar segment and a second tubular segment formed in situ of the planar segment.

A further feature of the present invention is to eliminate hard surface grips by the preceding method further characterized by heating the 360 degree surface by directing part of the heat energy through the mold per se and directing part of the heat energy through a heater formed separately of the mold.

A still further feature of the present invention is to eliminate hard surfaces in the grip portion of door handles formed integrally of a vehicle door by the preceding methods further characterized by forming a mold with a partial tube segment formed therein; locating a plug in the mold to complete a full 360 degree tube segment and applying part of the heat to the tube segment through the mold and part of the heat to the tube segment through the plug.

Still another aspect of the present invention is to provide such methods for forming a soft handgrip on an integral door handle wherein the heat source is in part provided by locating a moveable heater on the mold and selectively moving the heater into either a first position on the mold to form a heated tube segment onto which thermoplastic material can be cast to form a full 360 degree tube skin for a handle grip or into a second position raised from the mold to form a demolding path to remove the tube skin from the mold along with a shell formed integrally of the tube skin.

Yet another feature of the present invention is to provide an improved apparatus to practice the preceding methods including a mold with a recess therein forming a partially closed curved surface for receiving thermoplastic material during a casting cycle; plug means on the mold for closing the curved surface, the plug means having an inboard surface thereon extending the partially closed curved surface to form a full 360 degree continuous curvilinear surface for receiving thermoplastic material, fusing the thermoplastic material and curing the thermoplastic material and heater means being located on the plug means for directing heat into part of the full 360 degree continuous curvilinear surface.

Yet another feature of the present invention is to provide lift means secured to the mold of the preceding paragraph for moving the plug means into either a closure position in which the partially closed curved surface is closed to define the full 360 degree continuous curvilinear surface prior to casting thermoplastic material thereagainst or into a demolding position wherein the partial surface is opened to demold a formed tube skin following the casting process.

BRIEF DESCRIPTION OF THE DRAWING

Other advantages of the present invention will be readily appreciated as the same becomes better understood by reference to the following detailed description when considered in connection with the accompanying drawings wherein:

FIG. 1 is a perspective view of a vehicle door panel having an integral door handle of the present invention;

FIG. 2 is an enlarged longitudinal sectional view taken along line 2—2 of FIG. 1 looking in the direction of the arrows;

FIG. 3 is an enlarged cross-sectional view taken along line 3—3 of FIG. 2 looking in the direction of the arrows;

FIG. 4 is a fragmentary perspective view of a plastic shell formed by the method of the present invention;

FIG. 5 is a perspective view of apparatus of the present invention used to practice the method of the invention;

DETAILED DESCRIPTION OF PREFERRED EMBODIMENTS

Figure 6:
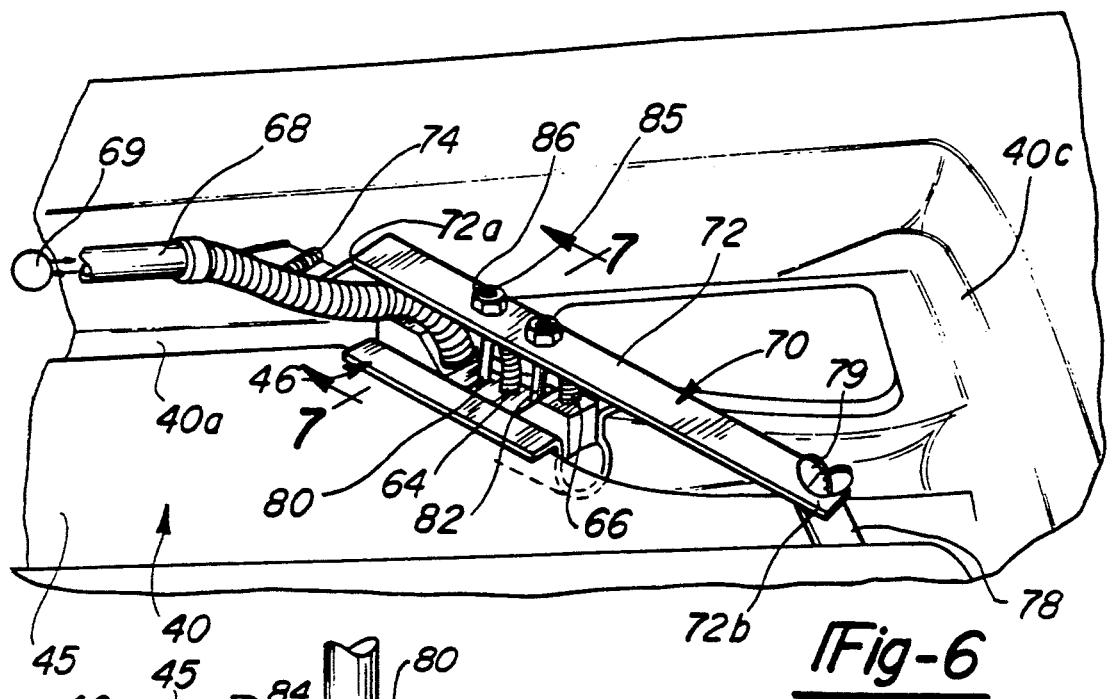
FIG. 6 is a view like FIG. 4 showing the apparatus in a casting position.

FIG. 1 is a perspective view of a product which embodies the article of the present invention. More particularly, it shows a vehicle door assembly 10 having a composite panel 12 made up of a reinforcing insert 14 and a cellular foam core 16, best seen in FIG. 2. A unitary single piece skin or shell 18 forms the interior surface of the door assembly 10. The shell 18 is preferably formed from a thermoplastic material such as vinyl plastisol, vinyl powder, vinyl acrylonitrile-butadiene-styrene and other well known plastics forming the outer decorative layer of products.

In accordance with the invention the shell 18 has a door handle tube skin segment 20 in the shape of a tube formed integrally with the panel 12 as part of the shell 18. More particularly, the door handle tube skin segment 20 is formed completely around a reinforcement strip 22. The strip 22 is located centrally of the tube skin segment 20 and it extends axially of the tube skin segment 20 for reinforcing it throughout its length.

The reinforcement strip 22 has opposite ends 24, 26 thereon connected to spaced wall segments 28, 29 of the insert 14 by suitable fasteners, representatively shown as screws 32 held down by nuts 34.

The foam core 16 is formed in situ of the composite panel 12 and completely surrounds the reinforcement strip 22 end to end thereof and fills the door handle tube skin segment 20. The foam core 16 thereby serves to define a soft backing for a 360 degree soft feel, integral handle 30 on the composite panel 12.

Figure 7:
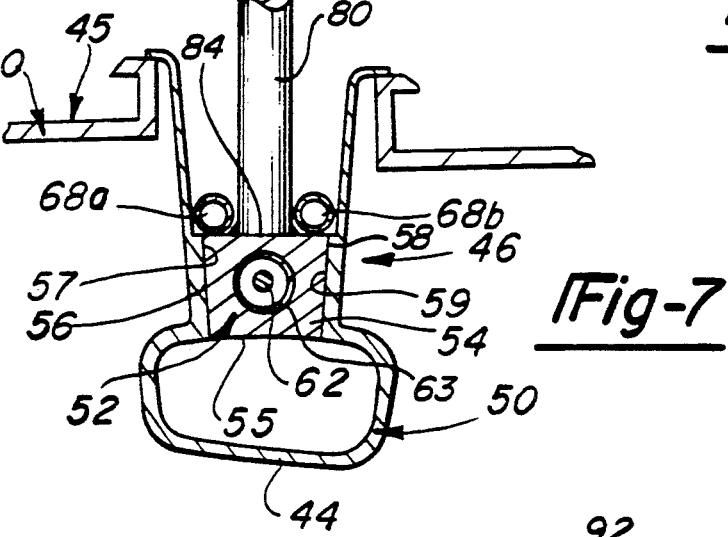
FIG. 7 is a sectional view taken along the line 7—7 of FIG. 6 looking in the direction of the arrows.
Figure 8:
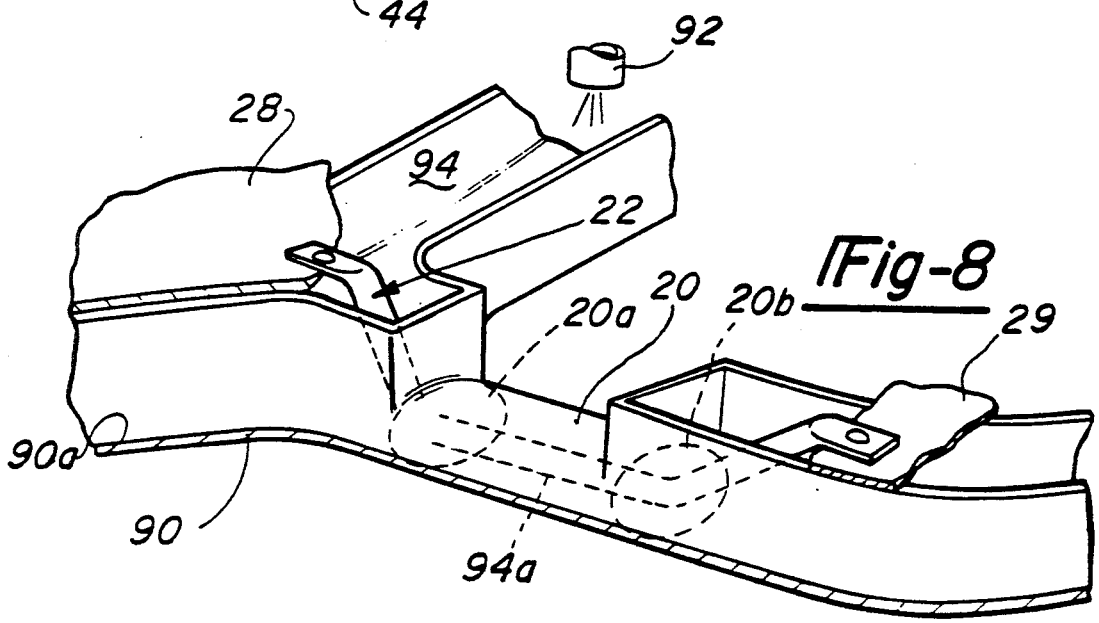
FIG. 8 is a perspective view of another step in practising the method of the present invention.

Referring now to FIGS. 6-8, the shell 18 is made by use of a shell mold 40 with a plurality of depressions 40a-40c therein which are configured to match the outer contour of the shell 18 on the door assembly 10.

The shell mold 40 is associated with a suitable heating and cooling source 42 which is arranged to direct heating or cooling medium against the inboard surface 44 of the shell mold 40. The shell mold 40 has an exposed casting surface 45 defined in part by depressions 40a-40c against which thermoplastic material is deposited during a molding process to be described.

One of the depressions 40b receives a mold insert 46 which has an inner surface 48 thereon forming part of a 360 degree tube surface 50. The remainder of the 360 degree tube surface 50 is formed in part by a heater assembly 52. The heater assembly includes a plug 54 having an inboard surface 55 completing the 360 degree tube surface 50. The plug 54 has spaced side surfaces 56, 58 thereon located in sealed engagement with spaced inlet surfaces 57, 59 on the insert 46. The inlet surfaces 57, 59 define an insert opening 60 through which the plug 54 is inserted during a casting sequence and from which the plug 54 is removed to allow part demolding.

The plug 54 is machined from a suitable heat conductive metal with a thermal coefficient of expansion like that of the shell mold 40. An electrical resistance heater 62 is directed through a plug bore 63. The heater 62 is electrically connected to electrical leads 64, 66 for supplying electrical power to heater 62 during a fusion and cure cycles to be described. A cooling tube 68 is secured to the plug 54 and has opposite ends thereof connected to pipes 68a and 68b for supplying cooling medium from a suitable coolant source 69.

The electrical leads 64, 66 and pipes 68a, 68b are flexible and have a length which will enable the plug 54 to be moved from a demolding position shown in FIG. 5 to the molding position of FIG. 6. A lift bracket assembly 70 provides for movement of the plug 54 between the molding and demold positions.

More particularly the lift bracket assembly 70 includes an arm 72 with an inwardly bent end 72a connected to a hinge 74 secured to a waste surface region 76 of the shell mold 40. The opposite end 72b of the arm 72 is connected to a side bracket 78 on the shell mold 40 where it is secured in place by a screw 79 to a tapped hole in the bracket 78.

The plug 54 is secured to the arm 72 for swinging movement therewith by a pair of spaced posts 80, 82 each welded at one end to the outboard surface 84 of the plug 54 and each having a threaded end 85 thereon directed through the arm 72 to be held thereagainst by nuts 86.

The method of the present invention utilizes a shell mold 40 and heater assembly 52 as described above to form the integral handle 30 of the invention. More particularly, in accordance with other aspects of the invention, a method is provided which includes the steps of directing heat from one source, e.g. a gas heater, against the inboard surface 44 of the shell mold 40 to provide part of the heat to the surface 50. Other heat is directed from a second source, e.g., the electrical resistance heater assembly 52, to heat the remainder of the surface 50. The heat from the first and second sources is applied during a molding sequence in which a suitable charge of thermoplastic material is directed onto an exposed casting surface 45 on the shell mold 40 and through the tube section having the surface 50 formed on the interior thereof.

The thermoplastic material can be a resin material with a suitable plasticizer and pigmentation in either a slurry form or in a dry powder or paste form. One suitable material for the dry powder is polyvinyl chloride. The preferred embodiment uses a charge of dry powder particles which is deposited on the heated casting surface 45 which is moved, e.g., rotated or oscillated, such that part of the material flows across surface 50. A part of the charge is adhered to the heated surfaces 45 of the shell mold and to the inboard surface 55 of the heater assembly 52. The particles of powder fuse together to form a layer of material that forms the shell 18. Following fusion, the layer of material is cured and then the shell mold 40 and plug 54 are cooled prior to demolding. The heater assembly 52 is pivoted away from the shell mold 40 to enable the shell 18 and the integral full 360 degree tube skin 20 to be demolded through the insert opening 60.

Another aspect of the present invention is a method of combining the shell 18 and integral tube skin 20 into a composite structure having an integral handle 30 with a full 360 degree soft surface at the hand grip of the handle. The method includes placing the shell 18 onto a cavity mold 90, the bottom surface 90*a* thereof shown in FIG. 8. The skin handle tube segment 20 is shaped to have openings 20*a*, 20*b* at opposite ends. First the reinforcement strip 22 is snaked through the tube skin segment 20. Then the insert member 14 is located in the cavity mold 90 and fastened to the reinforcement strip 22. At this point the pour mold is opened and foam precursors are directed through a supply nozzle 92 into a molding space 94 formed between the shell 18 and the reinforcing insert 14. The pour mold lid (not shown) is closed and the foam precursors are reacted to fill the space 94 with soft, flexible cellular foam which is bonded to the insert 14 on one side and to the shell 18 of the other side. The foam precursors have a suitable viscosity which allows it to fill a handle space 94*a* which is formed between tube segment 20 and the reinforcement strip 22. Following formation of the cellular foam core 16, the bonded insert 14, core 16 and shell 18 combine to form the composite panel 12. The panel 12 is removed from the cavity mold, the surfaces of which are pre-sprayed with suitable mold release agents. The panel 12 is then attached to frame elements (not shown) to form the door assembly 10.

While the invention has been described in an illustrative manner with reference to an integral handle on a vehicle door interior panel of composite form, the invention is equally applicable to other products including hand grips for various forms of vehicle interior products, hand grips on luggage and on other products having a plastic outer shell or skin. It is therefore to be understood that the invention may be practiced otherwise than as specifically described herein and yet remain within the scope of the appended claims.

What is claimed is:

1. Apparatus for molding a shell of thermoplastic material having an integral tube handle portion thereon including a heated mold with a recess therein, said apparatus comprising:

means forming a partially closed curved surface defining an opening therein;

said surface being in the recess for receiving thermoplastic material during a casting cycle;

plug means for closing the opening in said curved surface, said plug means having an inboard surface thereon extending said partially closed curved surface to form a full 360 degree continuous tube surface constructed to receive thermoplastic material that is fused and curved therein; and heater means in said plug means for directing heat into part of the full 360 degree continuous tube surface.

2. The mold apparatus of claim 1, further comprising:

lift means secured to said mold for moving said plug means into either a closure position in which said opening is closed to complete the tube surface prior to casting thermoplastic material thereagainst or into a demolding position wherein said tube surface is opened to remove a formed tube skin from the mold.

* * * * *